United States Patent [19]

Thayer et al.

[11] Patent Number: 4,805,401

[45] Date of Patent: Feb. 21, 1989

[54] CONTROL VENT FOR DIVERTING EXHAUST NOZZLE

[75] Inventors: Edward B. Thayer, Jupiter; Herman L. Stevens, West Palm Beach, both of Fla.

[73] Assignee: United Technologies Corporation, Hartford, Conn.

[21] Appl. No.: 86,342

[22] Filed: Aug. 18, 1987

[51] Int. Cl.⁴ .............................................. F02K 3/02
[52] U.S. Cl. .................................... 60/226.2; 60/229; 60/230; 239/265.27; 239/265.29; 239/265.33
[58] Field of Search ............. 60/226.2, 229, 230, 60/39.29, 226.1; 239/265.29, 265.27, 265.33, 265.37, 265.39, 265.41, 265.19; 244/110 B, 12.5, 23 D

[56] References Cited

U.S. PATENT DOCUMENTS

| | | | |
|---|---|---|---|
| 3,667,680 | 6/1972 | Weed | 239/265.29 |
| 3,779,010 | 12/1973 | Chamay et al. | 60/226.2 |
| 4,605,169 | 8/1986 | Mayers | 239/265.29 |
| 4,690,329 | 9/1987 | Madden | 60/226.2 |

*Primary Examiner*—Donald E. Stout

[57] ABSTRACT

A thrust vectoring exhaust nozzle (6) is provided with a vent bypass (38) and flow control valve (44) to vent a portion (43) of the exhaust gas (2) only during diversion of the exhaust gas (2) into an alternative gas flow path (18).

7 Claims, 4 Drawing Sheets

CONTROL VENT FOR DIVERTING EXHAUST NOZZLE

This invention was made with Government support under a contract awarded by the Department of the Air Force. The Government has certain rights in this invention.

FIELD OF THE INVENTION

The present invention relates to an exhaust nozzle for a gas turbine engine wherein the engine working fluid is divertable between two flow discharge paths.

BACKGROUND

Variable area exhaust nozzles for gas turbine engines are used in a variety of aircraft applications to optimize engine thrust in response to varying temperature, pressure, and other environmental and operational conditions. Such nozzles include a primary flow path, typically exhausting the working fluid axially, which is equipped with a flap or other means for selectably varying the nozzle outlet area.

During landing and/or other maneuvers, it is desirable to divert the working fluid from the axial direction to induce a vectored thrust for maneuvering or slowing the aircraft. One such thrust vectoring arrangement provides an alternate working fluid discharge path within the nozzle structure, including means for admitting the working fluid into such alternate discharge path and closing off or otherwise substantially restricting the primary axial flow discharge path. An example of such arrangement is shown in U.S. Pat. No. 4,605,169, wherein a pivoting convergent flap moves into the axially flowing working fluid for blocking off a portion of the axial path flow area as required to provide optimum engine thrust. This same flap blocks off the alternate discharge path over a normal range of flap pivoting motion, unblocking the alternate flow path when pivoted into the primary flow path beyond a certain point, thereby admitting working fluid into the alternate path for generating reverse thrust.

Another arrangement is shown in commonly assigned, pending U.S. patent application Ser. No. 030,794, titled "Method and Linkage for Positioning a Convergent Flap and Coaxial Arc Valve", filed on Mar. 27, 1987, now U.S. Pat. No. 4,767,055, which discloses a convergent flap pivotable into the primary axial working fluid discharge path and including a semicylindrical arc valve normally blocking the alternate working fluid discharge path. The arc valve and convergent flap are joined by a mechanical linkage which opens the arc valve in response to movement of the convergent flap into the primary exhaust path resulting in a primary path flow area less than a preset minimum area. Both the linkage shown in application Ser. No. 030,794 and the arrangement shown in U.S. Pat. No. 4,605,169 are operable to divert the working fluid flow between the primary axial flow discharge path and the alternate thrust vectoring flow discharge path responsive to the movement of the convergent flap only. Thus a single actuator provides both axial thrust area variation and diversion of the working fluid into the thrust vectoring flow path.

The saving in weight realized by the use of a single actuator is offset in the prior art arrangements by the operational inflexibility caused by linking the movement of the convergent flap to the opening of the alternate working fluid discharge path. In each case, the collective nozzle flow discharge area must be reduced to a preset minimum area before the alternate working fluid discharge path begins to open. The selection of the preset minimum area is responsive to two, possibly conflicting, considerations: (1) the minimum nozzle area necessary to provide optimum engine thrust over all engine operating conditions, and (2) the minimum acceptable nozzle outlet area for engine stability over all operating conditions.

For those engine-nozzle configurations wherein the minimum nozzle area based on stability considerations is greater than the minimum nozzle area necessary for optimum thrust, the opening of the alternate working fluid discharge path must be scheduled so as to insure stable engine operation at all points in the engine operating envelope. Thus the nozzle arrangement is unable to achieve optimum thrust under certain conditions due to an over area condition in the primary axial working fluid discharge path.

One solution to this over area condition is to provide a separate actuator for the alternate discharge path regulating means, thereby allowing the nozzle control system to schedule the opening of the alternate path based on current engine and environmental conditions. As noted above, such additional actuators and compexity is undesirable from weight, cost, and operational considerations.

SUMMARY OF THE INVENTION

It is therefore an object of the present invention to provide a dual path, variable area exhaust nozzle for a gas turbine engine wherein the collective working fluid flow area is controlled to provide optimum thrust and engine stability at varying engine power levels and environmental conditions.

It is further an object of the present invention to provide an exhaust nozzle having one primary, variable area working fluid discharge path and an alternative working fluid discharge path which is closed to working fluid flow when the flow area of the primary path is greater than a preset minimum area.

It is further an object of the present invention to provide a working fluid vent, opening during transition of working fluid flow from the primary path to the alternative path, for passing a portion of the working fluid out of the nozzle thereby increasing the collective nozzle outlet area above the preset minimum area prior to opening the alternate working fluid discharge path.

It is still further an object of the present invention to regulate the flow of working fluid through the vent responsive to the movement of a thrust vectoring vane cascade, or the like, disposed in the alternative discharge path, the vane cascade moving from a stowed orientation into one of a range of operating orientations prior to the opening of the alternative discharge path.

According to the present invention, a variable area exhaust nozzle for an aircraft gas turbine engine is provided with an alternative working fluid discharge path for exhausting the working fluid when a primary discharge path is closed off. The nozzle further includes a thrust vectoring vane cascade or the like, disposed in the alternative discharge path, for directing the flow of working fluid therethrough, thus achieving reverse, lift, or forward thrust as desired.

The alternative discharge path opens in response to a reduction of the primary discharge path flow area below a preset minimum flow area. By linking the opening of the alternative path to the closing of the primary path, the nozzle avoids the requirement and weight of an independent alternative path flow control actuator.

As discussed hereinabove, the preset minimum area necessary to provide the optimum forward nozzle thrust under certain engine operating conditions may be too small to maintain stable engine operation under certain other operating conditions. For prior art nozzles, attempting to divert the working fluid into the alternative discharge path under such other conditions may thus result in an undesirable instability in the gas turbine engine.

The present invention provides a vent conduit or the like for passing a portion of the working fluid from the nozzle when the working fluid is about to be diverted into the alternative discharge path. Control of the flow in the vent is achieved by a valve, integrated with at least one of the pivoting vanes in the thrust vectoring cascade. The valve is closed to fluid flow when the cascade is in a stowed orientation, opening when the vane cascade is moved into at least one of the orientations in the cascade operating range prior to the admission of working fluid into the alternative discharge passage.

The present invention thus provides additional working fluid discharge flow area only when the fluid flow is first being diverted into the alternative discharge path. Such selective flow increase, by using the movement of the vane cascade to open and close the vent conduit, is achieved without additional weight, complexity or cost which can accompany a dedicated and independent actuator. Engine instability resulting from insufficient working fluid discharge area is avoided, while engine operation with greater than optimum working fluid discharge flow area is minimized.

Both these and other objects and advantages of the nozzle according to the present invention will be apparent following a review of the following description and the appended claims and drawing figures.

DETAILED DESCRIPTION OF THE INVENTION

Figure 1:
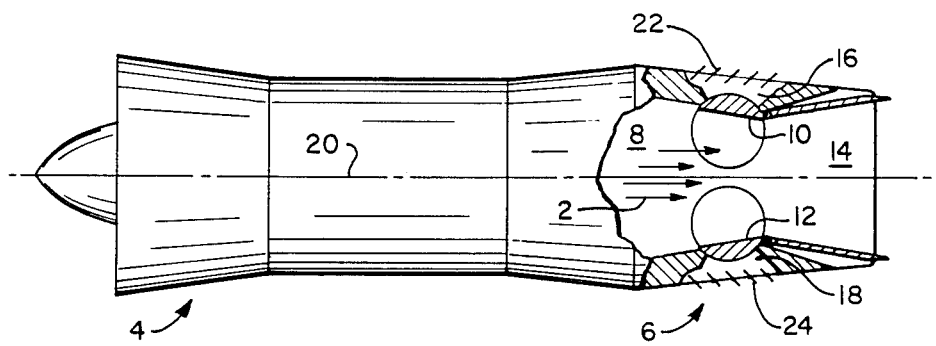
FIG. 1 is a general arrangement of an aircraft gas turbine engine having an exhaust nozzle with a variable primary working fluid discharge path and an alternative working fluid discharge path having a thrust vectoring means disposed therein.

FIG. 1 shows a schematic representation of a gas turbine engine 4 and a discharge nozzle 6 receiving a flow of working fluid 2 from the engine 4 into the nozzle interior 8. The nozzle 6 includes a pair of oppositely disposed convergent flaps 10, 12 which move into a primary working fluid discharge flow path 14 for regulating the discharge area of the primary flow path 14.

The nozzle 6 also includes alternative working fluid discharge paths 16, 18 extending laterally with respect to the engine axis 20 and having respective thrust vectoring means 22, 24 disposed therein.

During normal engine operation, the engine working fluid 2, which includes both the products of combustion exhausted from the gas generator or core engine as well as the relatively cool bypass air flowing in a concentric duct about the core engine, enters the interior 8 of the nozzle 6 and exits by the primary, axial working fluid discharge path 14 for propelling the aircraft (not shown). Nozzle outlet area is controlled by positioning the convergent flaps 10, 12 to achieve the desired nozzle outlet area for optimum engine thrust based upon engine power level, environmental conditions, etc.

During periods, such as takeoff, landing, or maneuvering when other than generally axial thrust is required, the working fluid 2 is diverted into the alternative discharge paths 16, 18 and vectored by the vectoring means 22, 24.

As noted hereinabove, the linking of the opening of the alternative discharge paths 16, 18 to the closing of the primary path 14 establishes a preset minimum area, $A_{min}$, which is present in the nozzle 6 at the point wherein the working fluid 2 just begins to enter the alternative flow paths 16, 18. The selection of $A_{min}$ during the nozzle design process must reflect at least two critical design considerations: first, the collective nozzle outlet area during all modes and conditions of operation must never be less than the minimum area required for stable engine operation. If the collective nozzle flow area falls beneath the required outlet area, surge or other undesirable engine conditions may result, leading to failure or severe diminishment of performance. Second, the primary nozzle path 14 must be adjustable to provide the maximum efficient forward thrust over all ranges of engine operation and environment.

These two design requirements can conflict, as when the collective working fluid flow area required for efficient forward thrust under certain conditions is smaller than the collective nozzle flow area required for engine stability under certain other operating conditions. As the single actuator convergent flap and alternative discharge path flow regulating means can divert the working fluid 2 between the primary discharge path 14 and the alternative discharge paths 16, 18 only by closing the primary path 14 to a preset $A_{min}$, designers have been forced to set $A_{min}$ such that it will be at least as great as the largest minimum nozzle outlet area required for engine stability over all parts of the engine operating envelope. Such sizing leads to an over area configuration under the certain operating conditions described above wherein it is desired to configure the nozzle 6 for maximum forward thrust.

The present invention provides an additional working fluid vent, open to pass working fluid only during diversion of the working fluid 2 between the primary flow path 14 and the alternative flow path or paths 16, 18. The additional working fluid discharge flow area provided is sufficient to raise the collective nozzle discharge flow area above the minimum required for stable engine operation under the certain other conditions, but when closed off during forward thrust operation, still permits the primary discharge path 14 to be closed down to a minimum area sufficient to achieve optimum engine thrust under the certain operating conditions.

Figure 2:
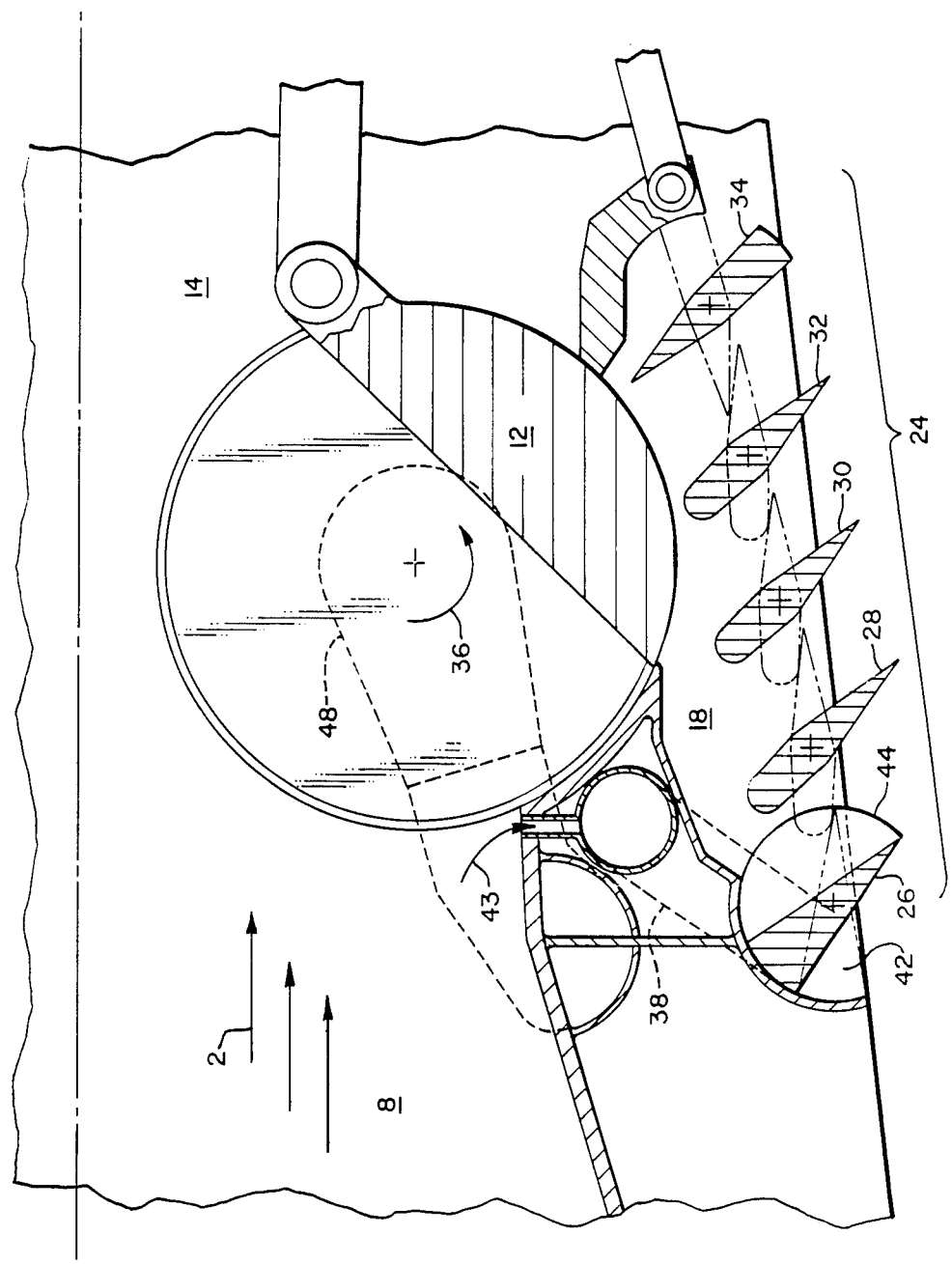
FIG. 2 shows a more detailed view of the vent of the nozzle according to the present invention and a vane of the cascade of vanes of the thrust vectoring means.

The present invention provides not only a vent for passing the working fluid, but also a vent flow regulating means operable only during diversion of the working fluid 2 between the primary discharge path 14 and the alternative path or paths 16, 18. One such embodiment is shown in a more detailed view of the nozzle 6 as shown in FIG. 2 showing the lower convergent flap 12 and a plurality of parallel, pivoting vanes 26, 28, 30, 32, 34 which comprise the thrust vectoring means 24 disposed in the alternative discharge path 18. The convergent flap 12 is shown rotated 36 into the primary working fluid discharge path 14 as far as possible without opening the alternative discharge path 18. Thus, the flow area of the primary 14 is at the preset area $A_{min}$.

The plurality of vanes 26–34 are selectably oriented by a vectoring actuator (not shown) allowing the vectoring means 24 to achieve not only a stowed orientation, shown in phantom wherein each of the vanes overlaps the next adjacent vane for defining a relatively unbroken external surface, but also any one of a range of operating orientations wherein the individual vanes 26–34 are aligned to direct a flow of working fluid 2 passing through the alternative discharge path 18 for achieving forward, lateral, or even reverse thrust.

One such orientation of the range of operating orientations of the plurality of vanes 26–34 is shown in FIG. 2 by the solid representation of the individual vanes 26–34. In the depicted operating orientation, the individual vanes 26–34 have been rotated clockwise from the stowed orientation, defining therebetween a plurality of flow channels for directing any working fluid passing through the alternative discharge path 18 in a generally rearward direction, thereby achieving a forward thrust configuration. Diversion of the working fluid through the alternative discharge path 18 is maximized by positioning the convergent flap 12 fully across the rearward gas flow path wherein the primary discharge path 14 is completely closed off, thereby diverting all working fluid 2 into the alternative path 18.

The present invention provides a vent conduit or other fluid communication means 38 receiving a portion 43 of the working fluid 2 prior to the discharge paths 14, 18 and having an opening 42 for discharging the vented portion 43 independent of the defined primary and alternative paths 14, 18.

The regulation of the flow of the portion 43 of the working fluid 2 through the vent 38 according to the present invention is provided by the movement of one vane 26 of the plurality of vanes 26–34. This one vane 26 includes at least one semicircular blocking plate 44 secured adjacent one of the vane span ends for blocking off the opening 42 of the vent 38. Thus, when the vane 26 is in the stowed orientation, the blocking plate 44 covers the opening 42 preventing the flow of working fluid 43 into and through the vent 38. Convergent flap 12 may thus be positioned 36 freely to control the flow area of the primary discharge path 14, reducing such area down to the preset minimum area, if desired.

When it is the intention of the aircraft operator to initiate thrust vectoring by admitting the working fluid 2 into the alternative working fluid discharge path 18, the thrust vectoring actuator (not shown) opens the thrust vectoring means 24 by positioning the cascade vanes 26–34 into at least one of the plurality of operating orientations preparatory to diverting the working fluid 2 into the alternative discharge path 18. Such reorientation of the individual vanes, and in particular of the one vane 26, opens the vent 38 to the flow of working fluid 43, thus increasing the collective working fluid discharge flow area. The vent 38 is sized to provide sufficient collective flow area at the transition between the primary and alternative discharge paths 14, 18 so as to avoid the occurrence of engine instability due to insufficient working fluid discharge flow area.

Figure 3:
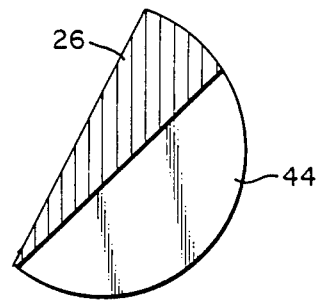
FIG. 3 shows a more detailed view of the vane of FIG. 2.

FIG. 3 shows a more detailed view of the one vane 26 and the blocking plate 44 of the embodiment of FIG. 2 as it would appear removed from the vectoring means 24.

Figure 4:
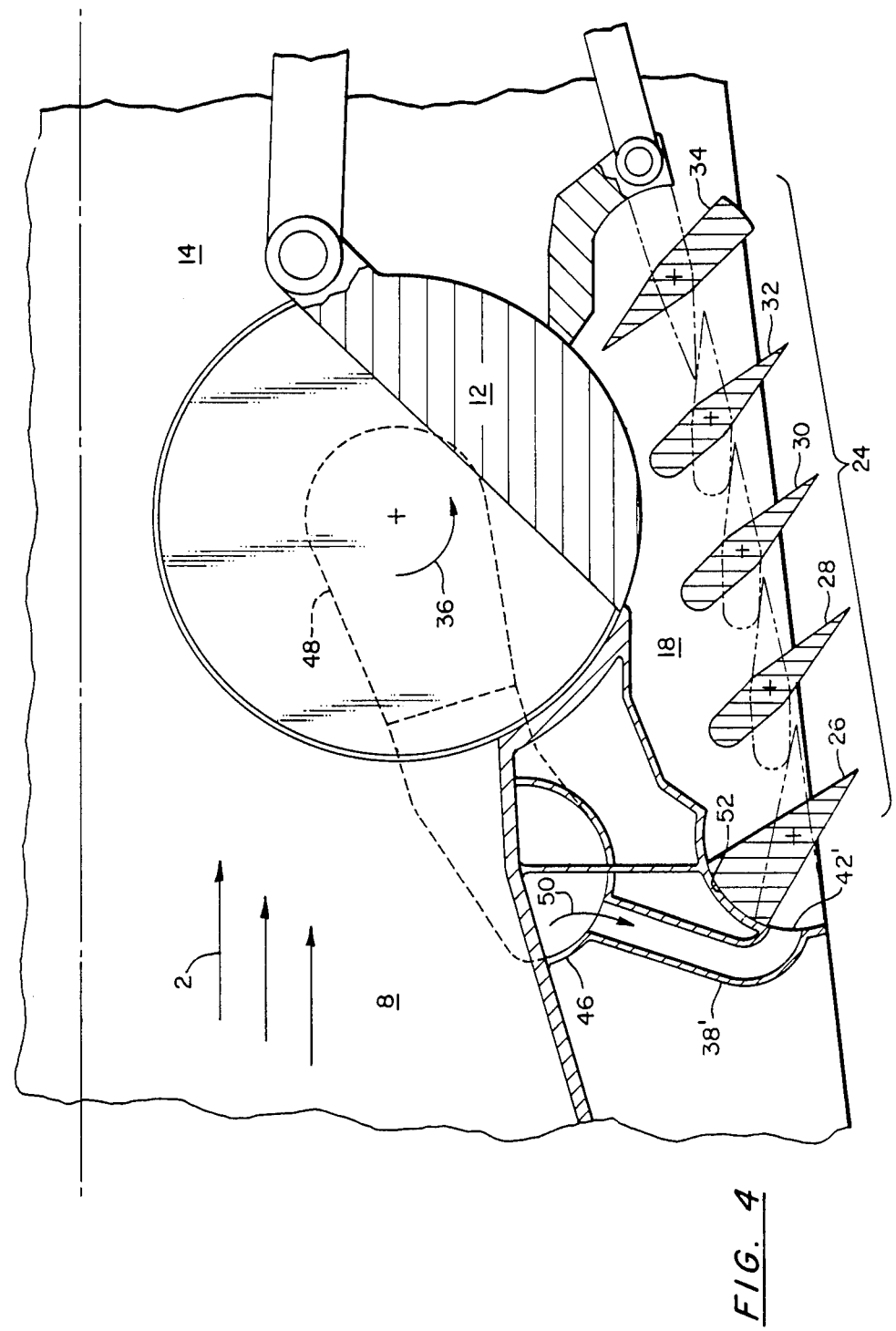
FIG. 4 shows a second embodiment of the nozzle and vent according to the present invention.

FIG. 4 shows an alternative embodiment of the nozzle according to the present invention wherein the vent 38' is disposed between a cooling air manifold 46 which conducts relatively cool, pressurized cooling air between the compressor section (not shown) of the gas turbine engine 4 and various structures of the nozzle 6, such as the convergent flap 12 via cooling ducts 48. Such pressurized cooling air, as noted hereinabove, is also working fluid for the purposes of this invention, being discharged through the discharge paths 14, 18 after performing the cooling duty within the various nozzle structures. Thus, diverting a portion 50 of the cooling air from the cooling air manifold 46 is equivalent to diverting a portion of the working fluid 2 from the nozzle interior 8 as in the previous embodiment.

As with the previous embodiment, one vane 26 of the plurality of vanes 26–34 regulates the admission of the working fluid (cooling air) 50 into the vent conduit 38'. In the alternative embodiment of FIG. 4, the vent discharge opening 42' comprises a plurality of slotted or other openings disposed parallel to the span of the one vane 26 and being sealingly engageable with a semicylindrical surface 52 integral therewith. As with the previous embodiment, the blocking surface 52 of the vane 26 engages and seals with the discharge opening 42' when the vane 26 is in the stowed orientation represented by the broken outline. As represented by the solid outline in FIG. 4 of the vanes 26–34, the orientation of the one vane 26 in an operating orientation results in an unporting or opening of the discharge opening 42', thereby opening the vent conduit 38' to the flow of cooling air or working fluid 50 therethrough.

Figure 5:
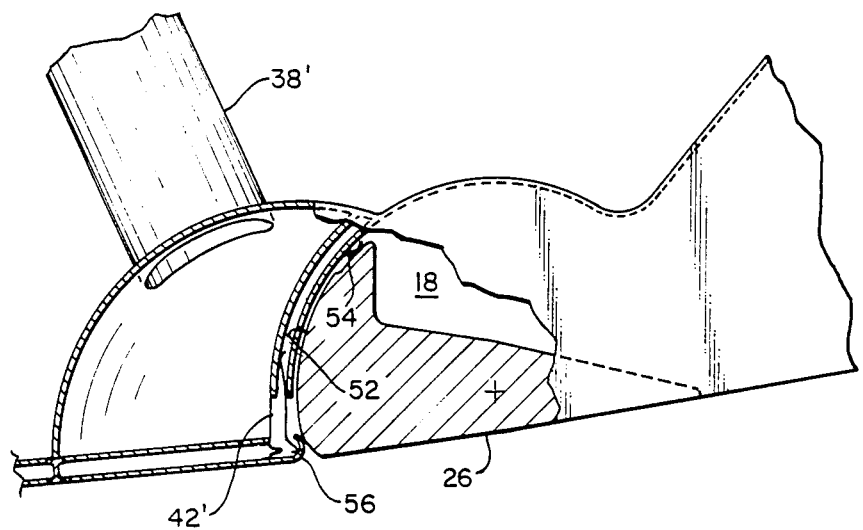
FIG. 5 shows a closeup view of the vent arrangement of FIG. 4.

FIG. 5 shows a closer view of the one vane 26 having the semicylindrical blocking surface 52 engaged with the vent discharge opening 42'. Effective sealing between the opening 42' and the blocking surface 52 may be achieved by the use of simple linear seals 54, 56 disposed along the span of the vane 26 and engageable between the blocking surface 54 and the internal surface of the alternative discharge path 18.

The present invention is thus well adapted to achieve effective, efficient, and stable engine and nozzle operation over all operating conditions and environments without the need for additional and separate actuators for achieving the proper collective nozzle working fluid discharge area. By integrating the movement of the convergent flap 12 with the regulation of the flow area of the primary and alternative working fluid discharge paths 14, 18, and by integrating the flow through the vent means 38 with the orientation of the thrust vectoring means 24 disposed in the alternative flow discharge path, the nozzle according to the present invention achieves the necessary and most efficient collective nozzle area automatically as a result of the movement of the individual control surfaces. Effective nozzle operation is thus achieved simply and without additional cost, weight, and complexity.

It should be appreciated that the two embodiments disclosed hereinabove are merely illustrative examples of a variety of equivalent configurations of the nozzle according to the present invention, and that the scope of said present invention is limited only by the claims presented hereinbelow.

We claim:

1. In a gas turbine engine having a stream of working fluid exhausted therefrom, said exhausted working fluid entering a nozzle structure having two working fluid discharge paths and means for biasing the flow of working fluid therebetween, said biasing means including means for selectably controlling the discharge flow area of the primary working fluid discharge path and the discharge flow area of the alternative working fluid discharge path such that the alternative discharge path is opened to pass working fluid therethrough only when the flow area of the primary discharge path is less than a preset minimum area, and means, disposed in the alternative discharge path, for selectably vectoring the flow of working fluid passing through the alternative discharge path, said vectoring means having an operating range of orientations and a stowed orientation, the improvement comprising:

means, responsive to the orientation of the vectoring means, separate and independent of the alternative discharge path, for venting a portion of the working fluid from the primary discharge path, the venting means being closed to working fluid flow when the vectoring means is in the stowed orientation, and open to working fluid flow when the vectoring means is in at least one of the orientations within the operating range.

2. The nozzle as recited in claim 1, wherein the vectoring means includes a plurality of individual, pivoting vanes arranged in a cascade, each vane overlapping a portion of the next adjacent vane when the cascade is in the stowed orientation, and adjacent vanes defining a plurality of parallel exhaust channels when the cascade is in the operating range of orientations.

3. The nozzle as recited in claim 2, wherein the venting means includes a conduit for establishing fluid communication between an interior volume of the nozzle and the nozzle exterior.

4. The nozzle as recited in claim 2, wherein the conduit includes a discharge opening disposed adjacent to one end of one of the plurality of pivotable vanes, and said one of the plurality of vanes further includes a semicircular flap, secured adjacent said one end of said one vane and pivotable therewith, the semicircular flap positioned to block off the conduit discharge opening when said one vane is in the stowed orientation.

5. The nozzle as recited in claim 1, wherein the working fluid comprises a flow of core engine gas from a gas generator portion of the gas turbine engine, and a flow of relatively cool bypass air from a fan section of the gas turbine engine, at least a portion of the bypass air being ducted into the nozzle for cooling, and wherein the venting means includes a conduit having an inlet opening for receiving a portion of the ducted bypass cooling air when the venting means is open to working fluid flow.

6. The nozzle as recited in claim 1, wherein the controlling means is a single, convergent flap disposed across the alternative discharge path and movable into the primary path, the convergent flap maintaining a flow blocking relationship with the alternative path while the flow area of the primary discharge path is greater than the preset minimum flow area.

7. The nozzle as recited in claim 1, wherein the vectoring means includes a plurality of parallel, pivotable vanes arranged in a cascade, and wherein the venting means includes an elongated discharge opening, disposed adjacent one of the plurality of vanes, and the one vane includes a semicylindrical portion, oriented coincident with the elongated opening when the vectoring means is in the stowed orientation and sealingly engaged therewith, said semicylindrical portion blocking off the flow of working fluid through the elongated discharge opening.

* * * * *